Sept. 11, 1928.  1,683,758

A. H. CANDEE ET AL

GEAR

Filed July 1, 1925

INVENTORS
ALLAN H. CANDEE
ERNEST WILDHABER.
BY
ATTORNEY

Patented Sept. 11, 1928.

1,683,758

UNITED STATES PATENT OFFICE.

ALLAN H. CANDEE AND ERNEST WILDHABER, OF ROCHESTER, NEW YORK, ASSIGNORS TO GLEASON WORKS, OF ROCHESTER, NEW YORK, A CORPORATION OF NEW YORK.

GEAR.

Application filed July 1, 1925. Serial No. 40,791.

The present invention relates to gears and particularly to gears whose axes are non-intersecting.

One object of our invention is to provide a pair of gears, consisting of a worm and a crown gear, that shall have improved tooth contact and less frictional loss than the usual worm gear drive.

A further object of the invention is to provide a pair of gears in which the driving member may have a greater diameter and consequently greater strength than in equal ratio bevel gear drives.

Further objects will be apparent hereinafter from the specification and from the appended claims.

While we have described and illustrated a particular embodiment of our invention, it is to be understood that the invention is subject to further modifications within its scope and within the limits of the claims.

Figure 1:
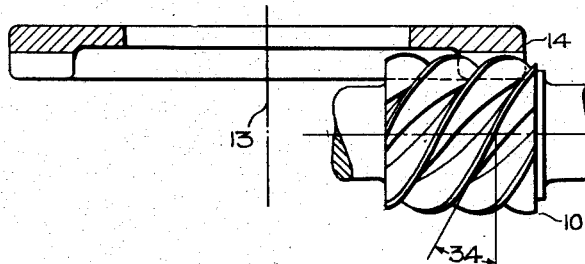
Fig. 1 is a plan view of a pair of gears constructed according to this invention.

The present invention consists specifically in a pair of gears one of which is a worm and the other a crown gear having longitudinally curved teeth, arranged with axes non-intersecting and non-parallel and having threads and teeth respectively of opposite hand.

In gear drives where the axes are either parallel or intersecting, the pitch diameters of the mating gears must be exactly proportional to their respective numbers of teeth and inversely proportional to the relative velocities. Where the axis of one of the gears, as the driving gear, is offset from the axis of the mating gear, the respective pitch diameters are independent of the gear ratio. Where one of the members is a worm, as in the present invention, its pitch diameter may be changed at will by altering its thread angle. Gears of the present invention have therefore the advantage that the driving member or worm may be made proportionately larger for the same ratio than in bevel gear or similar drives where the axes of the mating gears intersect.

The present invention not only provides a stronger driving member with a larger wearing surface, but also, as will be explained further hereinafter, provides a pair of gears of superior tooth contact.

Referring to the drawings, 10 indicates the worm or driving member of the new pair, having its axis at 11 offset a distance 12 from the axis 13 of the crown gear 14. The thread of the worm 10 is of opposite hand as compared to the hand of the teeth of the crown gear 14. The worm lies wholly on one side of a line drawn perpendicular to the axes of the worm and gear. The peripheral movement of the worm will be in the direction of the arrow 15 and the peripheral movement of the gear in the direction 16. The respective peripheral movements, as shown, are at an acute angle, whereas in ordinary worm drives the peripheral movements are at right angles. This means that there will be less sliding and therefore less frictional loss in a pair of gears constructed according to the present invention than in ordinary worm drives.

Figure 4:
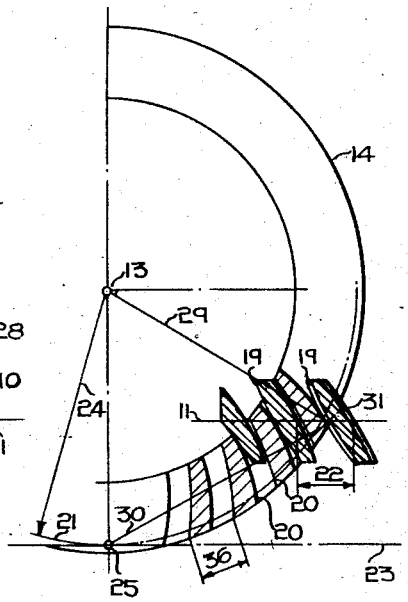
Fig. 4 is a sectional view corresponding to Fig. 3.

By taking a section through the worm thread and the gear teeth in a plane parallel to the worm axis and at right angles to the gear axis, we can analyze the tooth contact between the members of the new pair of gears. Such a section is shown in Fig. 4. In this figure, the sides of the worm thread are indicated at 19 and the sides of the gear teeth at 20. Assuming rotation between the worm and gear to occur at a uniform rate, the sections of the worm thread will travel in the direction of the projected worm axis 11 at a uniform velocity proportional to the lead of the thread. Since the thread sections will maintain the same shape during their travel along the line 11 and since the crown gear 14 will rotate at a uniform velocity proportional to said travel, the contact between the sides 19 of the worm and the sides 20 of the teeth of the crown gear will take place as if the sides 19 of the worm thread were sides of rack teeth and the sides 20 of the gear sides of a conjugate gear tooth. Considering the mesh of the worm and crown gear then as the mesh of a spur gear and rack, it will be understood that the circumference of the pitch circle of the gear must necessarily equal the distance the rack travels during one revolution of the gear. The lead will equal of course the axial pitch 22 of the worm multiplied by the number of threads or teeth.

If we let R equal the pitch radius of the crown gear, L the lead of the worm, N the number of teeth in the gear and N' the number of threads in the worm, we have:

$$R = \frac{L}{2\pi} \cdot \frac{N}{N'}$$

Knowing R, the pitch radius of the crown gear, considered as a gear rolling on a rack, we can construct the pitch circle 21 of this gear. The radius R is indicated at 24 in Fig. 4. If the mesh of crown gear and worm is considered as the mesh of a spur gear and rack, the pitch line of the rack must be tangent to the pitch circle of the gear. The imaginary pitch line of the rack is line 23 parallel to line 11 and tangent to the pitch circle 21 of the gear at the point 25. This point 25 is the pitch point for the conjugate profiles of gear and worm and through this point passes the instantaneous axis, or axis about which the rolling movement of gear and rack takes place at any instant. This axis in the present case is a line parallel to the axis of the crown gear. It is noted that the terms "pitch circle" and "pitch point" refer only to the analogy between the drive considered and a spur gear and rack drive.

By examining the tooth contact in a series of sections parallel to the section of Fig. 4, it will be found that in the new gearing the contact on one side of the teeth will extend diagonally across the height of the thread. It will be found also that the tooth surfaces and thread surfaces are comparatively close fitting. These qualities will enable the gears to carry heavy loads and resist wear.

The side where the advantage of the improved tooth contact is especially noticed is the side 27 facing toward the inner end 26 of the worm. The other side 28 of the worm has a contact with the gear similar to the contact in an ordinary worm drive. For drives running in one direction, most of the time, the side 27 will preferably be made the driving side. This corresponds to setting the worm below the center of the crown gear in rear axle drives of motor cars, when the motor rotates in the usual clockwise direction.

As will be seen from Fig. 4 the lead of the worm will be such in a pair constructed according to the present invention that lines 29 and 30 drawn respectively from the center of the crown gear and the instantaneous axis 25 to a point of contact 31 between the worm and crown gear will form an acute angle with each other.

Any usual form of thread may be employed for the worm. Preferably, however, the sides of the worm thread will be made portions of involute helicoidal surfaces. Such surfaces can readily be ground with a flat or plane surfaced grinding wheel. With this structure, in a section taken at right angles to the worm axis 11 the thread profiles 32 will be involutes of a base circle 33.

Figure 2:
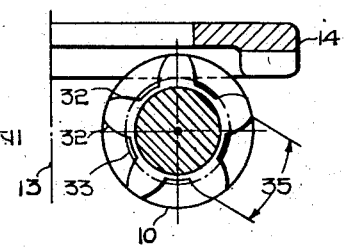
Fig. 2 is a view at right angles to Fig. 1, the parts being shown in section.
Figure 3:
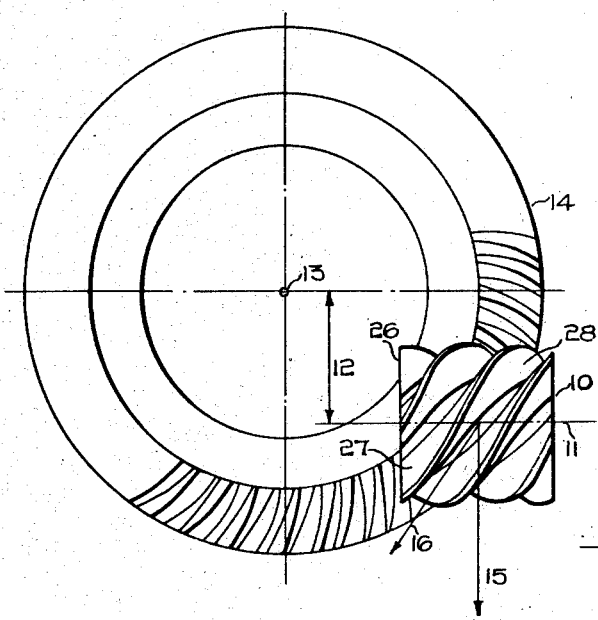
Fig. 3 is a side elevation of the pair shown in Fig. 1.

In the preferred structure, the outside thread angle of the worm indicated at 34 in Fig. 1 will be less than 45 degrees. The outside spiral angle is the complement of the outside thread angle. The spiral angle of the worm thread measured either at the outside or on the pitch surface will always be greater than the spiral angle of the gear teeth. The circumferential pitch of the worm on the outside, indicated at 35, in Fig. 2 will also preferably be at least one and one-half times the circumferential pitch 36 of the crown gear, indicated in Fig. 4. By so proportioning the thread and teeth of worm and gear respectively, we have found a strong and efficient drive can be secured.

Figure 5:
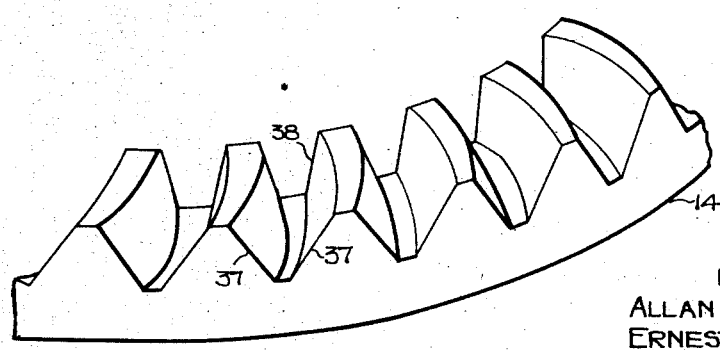
Fig. 5 is a detailed view showing in perspective and enlarged a portion of the crown gear member of the new pair.

As will be seen particularly from Fig. 5, the crown gear is provided with longitudinally curved teeth whose pressure angle increases continuously from the inside to the outside of the gear, being larger at 37 than at 38.

The worm member of the new pair may be produced in any convenient way, such as by milling or hobbing and may be finished by grinding. The crown gear may be produced by the action of a hob with dimensions corresponding to those of the worm, as is usual in producing worm wheels. The hob may be fed into depth in a direction at right angles to the axis of the crown gear blank, or it may be fed tangentially in the direction of the hob axis.

While we have illustrated a preferred embodiment of our invention it will be understood that the invention is capable of further modification within the limits of the disclosure and the scope of the appended claims. This application is intended to cover any variations, uses, or adaptations of our invention, following, in general, the principles of the invention and including such departures from the present disclosure as come within known or customary practice in the gear art and may be applied to the essential features hereinbefore set forth and as fall within the limits of the appended claims.

Having thus described our invention, what we claim is:

1. A pair of gears consisting of a cylindrical worm and a crown gear, provided with curved teeth which extend to the outer periphery of said gear, said gear having teeth of opposite hand as compared to the thread of the worm, the spiral angle of said gear teeth being less than the spiral angle of the worm thread.

2. A pair of gears consisting of a crown gear provided with curved teeth which extend to the outer periphery of the gear and a cylindrical worm arranged with its axis offset from the axis of the crown gear and extending between the axis of the crown gear and the toothed portion of said gear, said worm having a thread whose spiral angle is larger than the spiral angle of the teeth of the gear.

3. A pair of gears consisting of a crown gear provided with curved teeth which extend to its outer periphery and a cylindrical worm arranged with its axis offset from the axis of the crown gear and extending between the axis of the crown gear and the toothed portion of said gear, said gear and worm being of opposite hand and said worm having a thread whose spiral angle is larger than the spiral angle of the teeth of the gear.

4. A pair of gears consisting of a curved tooth crown gear having teeth which extend to its outer periphery and a cylindrical worm the peripheral movement of which is at an acute angle to that of the crown gear, said worm having a thread whose spiral angle is greater than the spiral angle of the teeth of the gear.

5. A pair of gears consisting of a curved tooth crown gear having teeth which extend to its outer periphery, and a cylindrical worm, the peripheral movement of which is at an acute angle to that of the crown gear, said gear and worm being of opposite hand and the spiral angle of said gear teeth being less than the spiral angle of the worm thread.

6. A pair of gears consisting of an involute helicoidal worm and a mating curved tooth crown gear.

7. A pair of gears consising of an involute helicoidal worm and a mating curved tooth crown gear, arranged with axes nonintersecting and non-parallel.

8. A pair of gears consisting of an involute helicoidal worm and a mating crown gear having teeth of opposite hand as compared to the thread of the worm.

9. A pair of gears consisting of an involute helicoidal worm and mating curved tooth crown gear having teeth of opposite hand as compared to the thread of the worm.

10. A pair of gears arranged with axes at right angles and non-intersecting, consisting of a worm and a mating curved tooth crown gear, having teeth which extend to its outer periphery, the worm being of cylindrical form with the outside thread angle less than 45 degrees, and with the threads of the worm and teeth of the gear respectively of opposite hand and with a spiral angle greater than the spiral angle of the gear teeth.

11. A pair of gears arranged with axes at right angles and non-intersecting, consisting of a worm and a mating curved tooth crown gear, having teeth which extend to its outer periphery, the worm being of cylindrical form with the outside thread angle less than 45 degrees, and with the threads of the worm and the teeth of the gear respectively of opposite hand, the driving side of the worm facing toward its inner end and the spiral angle of said worm thread being greater than the spiral angle of the gear teeth.

12. A pair of gears consisting of a crown gear and a worm extending diagonally across the face of said crown gear, the lead of the worm being such that lines drawn respectively from the center of the crown gear and the instantaneous axis to any point of contact between the worm and the crown gear form an acute angle.

13. A pair of gears consisting of an involute helicoidal worm and a mating curved tooth crown gear, said worm having a thread the spiral angle of which is greater than the spiral angle of the teeth of the gear.

14. A pair of gears arranged with axes at right angles and non-intersecting, consisting of a cylindrical worm and a mating curved tooth crown gear having teeth which extend to its outer periphery, said gears being so disposed relatively to each other that the worm lies wholly on one side of a line drawn perpendicular to the axes of the two gears.

ALLAN H. CANDEE.
ERNEST WILDHABER.